US007336602B2

(12) United States Patent
Silvester

(10) Patent No.: US 7,336,602 B2
(45) Date of Patent: Feb. 26, 2008

(54) APPARATUS AND METHOD FOR WIRELESS/WIRED COMMUNICATIONS INTERFACE

(75) Inventor: Kelan C. Silvester, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1077 days.

(21) Appl. No.: 10/060,757

(22) Filed: Jan. 29, 2002

(65) Prior Publication Data
US 2003/0142631 A1 Jul. 31, 2003

(51) Int. Cl.
*H04J 1/16* (2006.01)

(52) U.S. Cl. .................. 370/216; 370/242; 370/338; 455/552.1

(58) Field of Classification Search ............... 370/310, 370/311, 313, 338, 465, 216, 242, 252; 455/552.1, 455/553.1, 557; 379/93.07; 714/1, 2, 3, 714/4
See application file for complete search history.

(56) References Cited

U.S. PATENT DOCUMENTS

| | | | |
|---|---|---|---|
| 4,653,097 A | 3/1987 | Watanabe et al. | |
| 4,837,812 A * | 6/1989 | Takahashi et al. | ....... 379/93.07 |
| 5,465,401 A | 11/1995 | Thompson | |
| 5,636,464 A | 6/1997 | Ciluffo | |
| 5,758,021 A | 5/1998 | Hackbarth | |
| 5,861,822 A * | 1/1999 | Park et al. | .................... 341/22 |
| 5,875,449 A * | 2/1999 | Ono | ........................... 711/100 |
| 5,918,066 A | 6/1999 | Chuang-Sung et al. | |
| 5,995,839 A * | 11/1999 | Coursey et al. | ............. 455/445 |
| 6,131,136 A * | 10/2000 | Liebenow et al. | .......... 710/316 |
| 6,137,802 A * | 10/2000 | Jones et al. | ................. 370/401 |
| 6,192,255 B1 | 2/2001 | Lewis et al. | |
| 6,211,862 B1 * | 4/2001 | Park et al. | ................... 345/169 |
| 6,246,750 B1 * | 6/2001 | Ehreth | ........................ 379/56.2 |
| 6,324,271 B1 | 11/2001 | Sawyer et al. | |
| 6,366,622 B1 | 4/2002 | Brown et al. | |
| 6,397,061 B1 * | 5/2002 | Jordan et al. | ................ 455/421 |
| 6,430,395 B2 | 8/2002 | Arazi et al. | |
| 6,601,029 B1 | 7/2003 | Pickering | |
| 6,614,352 B2 | 9/2003 | Pellet et al. | |
| 6,633,761 B1 | 10/2003 | Singhal et al. | |

(Continued)

OTHER PUBLICATIONS

Krishnamurthy et al., "Security in Wireless Residential Networks", Feb. 2002, IEEE, pp. 157-166.

(Continued)

*Primary Examiner*—Min Jung
(74) *Attorney, Agent, or Firm*—Blakely, Sokoloff, Taylor & Zafman LLP

(57) ABSTRACT

An apparatus and method for wireless/wired Bluetooth™ communications interface are described. The method includes detection of a communications configuration of a device as one of a wireless communications interface and a wireless/wired communications interface. Once detected, it is determined whether a wired/wireless communications interface is the communications interface of the device. When such is the case, a data transmission error rate of the device is determined during operation of the device in a wireless communications mode. Next, the device is switched from the wireless communications mode to a wired communications mode when the data transmission error rate caused by wireless radio interference of the device exceeds a pre-determined threshold. As such, the present invention allows Bluetooth™ wireless communications devices to utilize a wired communications mode when transmission error rate exceeds a pre-determined threshold.

22 Claims, 11 Drawing Sheets

U.S. PATENT DOCUMENTS

| | | |
|---|---|---|
| 6,650,888 B1 | 11/2003 | Cook |
| 6,662,163 B1 | 12/2003 | Albayrak et al. |
| 6,711,381 B1 | 3/2004 | Cook et al. |
| 6,718,172 B1 | 4/2004 | Cook et al. |
| 6,738,457 B1 | 5/2004 | Pickering et al. |
| 6,745,253 B2 | 6/2004 | Struble |
| 6,766,160 B1 | 7/2004 | Lemilainen et al. |
| 6,772,331 B1 | 8/2004 | Hind et al. |
| 6,782,260 B2 | 8/2004 | Nakakita et al. |
| 6,853,851 B1 * | 2/2005 | Rautiola et al. ......... 455/553.1 |
| 6,868,385 B1 | 3/2005 | Gerson |
| 6,882,973 B1 | 4/2005 | Pickering |
| 6,937,977 B2 | 8/2005 | Gerson |
| 6,963,759 B1 | 11/2005 | Gerson |
| 6,978,127 B1 | 12/2005 | Bulthuis et al. |
| 6,985,714 B2 * | 1/2006 | Akiyama et al. ........... 455/402 |
| 6,999,721 B2 | 2/2006 | Ollis et al. |
| 7,061,365 B2 * | 6/2006 | Izumi ......................... 340/3.1 |
| 2001/0037197 A1 | 11/2001 | Boulanov |
| 2001/0044896 A1 | 11/2001 | Schwartz et al. |
| 2001/0052858 A1 | 12/2001 | Vincent et al. |
| 2001/0056349 A1 | 12/2001 | St. John |
| 2002/0077910 A1 | 6/2002 | Shioda et al. |
| 2002/0115044 A1 | 8/2002 | Shpiro |
| 2002/0129264 A1 | 9/2002 | Rowland et al. |
| 2002/0147653 A1 | 10/2002 | Shmueli et al. |
| 2003/0050009 A1 * | 3/2003 | Kurisko et al. ............... 455/41 |
| 2003/0065918 A1 | 4/2003 | Willey |
| 2003/0069844 A1 | 4/2003 | Koren |
| 2003/0071783 A1 * | 4/2003 | Chen ......................... 345/156 |
| 2003/0080869 A1 | 5/2003 | Pellet et al. |
| 2004/0025047 A1 | 2/2004 | Mayne et al. |
| 2004/0128519 A1 | 7/2004 | Klinger et al. |
| 2005/0102074 A1 * | 5/2005 | Kolls ......................... 701/29 |

OTHER PUBLICATIONS

Pei et al., "Bluetooth—The Fastest Developing Wireless Technology", Aug. 2000, IEEE, pp. 1657-1664.

Haartsen, J.C., "The Bluetooth radio system", IEEE Personal Communications, vol. 7, issue 1, Feb. 2000, pp. 28-36.

Sedov et al., "Hardware Security Concept for Spontaneous Network Integration of Mobile Devices", Jun. 2001, Springer-Verlag, pp. 175-182.

Haartsen et al., "Bluetooth—A New Low-Power Radio Interface Providing Short-Range Connectivity", Oct. 2000, IEEE, pp. 1651-1661.

Hubaux et al., "The Quest for Security in Mobile Ad Hoc Networks", 2001, ACM, pp. 146-155.

Sengodan et al., "On end-to-end security for Bluetooth/WAP and TCP/IP networks", Dec. 2000, Int'l Conf. on Personal Wireless Communications, IEEE, pp. 399-403.

U.S. Appl. No. 10/085,661, Office Action mailed Nov. 29, 2006.

U.S. Appl. No. 10/092,401, Office Action mailed Sep. 28, 2006.

Bluetooth, Specification of the Bluetooth System, vol. 1, ver. 1, p. 148-233, (Feb. 22, 2001).

Eustice et al, A universal information appliance, IBM Sys. J., vol. 38, No. 4, (1999).

Harmer et al., 3G products—what will the technology enable?, BT Technol J., vol. 19, No. 1 (Jan. 2001).

Olsen et al., Join and capture: a model for normadic interaction, UIST'01.

Zieniewicz et al., The evolution of army wearable computers, Pervasive Computing (Oct.-Dec. 2002).

* cited by examiner

APPARATUS AND METHOD FOR WIRELESS/WIRED COMMUNICATIONS INTERFACE

FIELD OF THE INVENTION

The invention relates generally to the field of wireless communications devices. More particularly, the invention relates to a method and apparatus for when a wireless/wired communications interface is detected as the communications configuration.

BACKGROUND OF THE INVENTION

The Bluetooth™ radio system is defined by a specification for a wireless, cable replacement solution based on radio frequency (RF) technology. In addition, Bluetooth™ has been specified and designed with emphasis on robustness and low cost. Implementations of Bluetooth™ are based on high performance, yet low-cost integrated radio transceivers. Accordingly, Bluetooth™ is defined as a protocol with a wireless interface. The frequency assignment that is utilized by Bluetooth™ within the United States is in the same radio frequency range as 802.11 wireless LAN (local area network), high end portable home phones, medical devices, as well as microwave ovens. As a result, the required nominal range of Bluetooth™ radio devices is set to approximately 10 meters, although distances may vary according to the power output of the radio.

Bluetooth™ is targeted at mobile and business users who need to establish a link or small network between their computers, cellular phones or other peripherals. To fill this communications need, a Bluetooth™ radio in a phone, PDA (personal digital assistant), headset, notebook computer or other device enables the devices to communicate with each other. As a result, Bluetooth™ is gaining in popularity as a wireless cable replacement technology. Moreover, Bluetooth™ provides a new market segment and devices to solve an age old problem of excessive number of wires used to connect personal computers (PCs) and other mobile devices. Unfortunately, devices in various environments cause radio traffic as well as interference problems in the radio frequencies utilized by Bluetooth™ devices.

As a result, communication information interference can become a problem when utilizing Bluetooth™-enabled devices. In addition, Bluetooth™ devices may cause interference problems with other devices. As described above, the frequency assignment to Bluetooth™ devices is in the same radio frequency range as 802.11 wireless LANs, high-end portable home phones, medical devices, as well as microwave ovens. Consequently, these other devices may cause interference with Bluetooth™-enabled devices. Conversely, Bluetooth™-enabled devices may affect the proper functioning of LANs, portable phones, medical devices, microwave ovens or the like.

Consequently, although Bluetooth™ devices may offer users the ability to replace the myriad of cables for attaching to various devices, the Bluetooth™ device is not immune to radio frequency interference. Hence, Bluetooth™ devices, when operated in the presence of significant radio frequency interference, will often perform poorly or even malfunction, which may lead to dissatisfaction of users of such Bluetooth™-enabled devices. This dissatisfaction may reach the point where users decline usage of Bluetooth™ devices and opt for standard wired connections, as are currently available in various devices described above. Therefore, there remains a need to overcome one or more of the limitations in the above-described existing.

BRIEF DESCRIPTION OF THE DRAWINGS

The present invention is illustrated by way of example, and not by way of limitation, in the figures of the accompanying drawings and in which.

DETAILED DESCRIPTION

Figure 1:
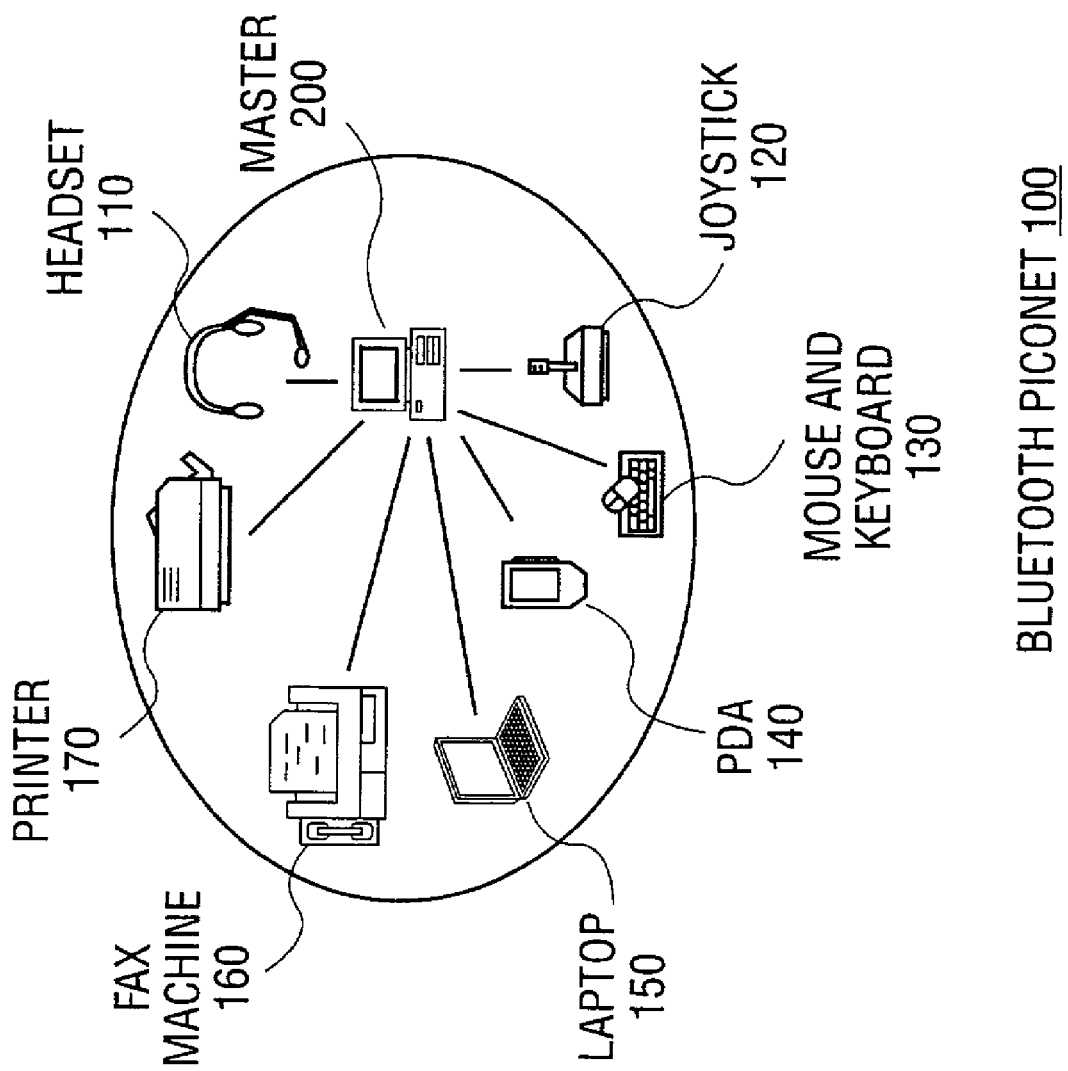
FIG. 1 depicts a block diagram illustrating a Bluetooth™ piconet utilizing a host computer configured to implement a wireless/wired Bluetooth™ communications interface, in accordance with one embodiment of the present invention.

A method and apparatus for wireless communications devices are described. The method includes detection of a communications configuration of a device as one of a wireless communications interface and a wireless/wired communications interface. Once detected, it is determined whether a wired/wireless communications interface is the communications interface of the device. When such is the case, a data transmission error rate of the device is determined during operation of the device in a wireless communications mode. Next, the device is switched from the wireless communications mode to a wired communications mode when the data transmission error rate of the device exceeds a pre-determined threshold. As such, the present invention allows Bluetooth™ wireless communications devices to utilize a wired communications mode when transmission error rate exceeds a pre-determined threshold.

In the following description, for the purposes of explanation, numerous specific details are set forth in order to provide a thorough understanding of the present invention. It will be apparent, however, to one skilled in the art that the present invention may be practiced without some of these specific details. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention. In other instances, well-known structures and devices are shown in block diagram form in order to avoid obscuring the details of the present invention.

Portions of the following detailed description may be presented in terms of algorithms and symbolic representations of operations on data bits. These algorithmic descriptions and representations are used by those skilled in the data processing arts to convey the substance of their work to others skilled in the art. An algorithm, as described herein, refers to a self-consistent sequence of acts leading to a desired result. The acts are those requiting physical manipulations of physical quantities. These quantities may take the form of electrical or magnetic signals capable of being stored, transferred, combined, compared, and otherwise manipulated. Moreover, principally for reasons of common usage, these signals are referred to as bits, values, elements, symbols, characters, terms, numbers, or the like.

However, these and similar terms are to be associated with the appropriate physical quantities and are merely convenient labels applied to these quantities. Unless specifically stated otherwise, it is appreciated that discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's devices into other data similarly represented as physical quantities within the computer system devices such as memories, registers or other such information storage, transmission, display devices, or the like.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software.

One of skill in the art will immediately appreciate that the invention can be practiced with computer system configurations other than those described below, including hand-held devices, multiprocessor systems, microprocessor-based or programmable consumer electronics, digital signal processing (DSP) devices, network PCs, minicomputers, mainframe computers, and the like. The invention can also be practiced in distributed computing environments where tasks are performed by remote processing devices that are linked through a communications network. The required structure for a variety of these systems will appear from the description below.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression.

Thus, one skilled in the art would recognize a block denoting "C=A+B" as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

In an embodiment, the methods of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

In one embodiment, the present invention may be provided as a computer program product which may include a machine or computer-readable medium having stored thereon instructions which may be used to program a computer (or other electronic devices) to perform a process according to the present invention. Accordingly, the computer-readable medium includes any type of media/machine-readable medium suitable for storing electronic instructions. Moreover, the present invention may also be downloaded as a computer program product. As such, the program may be transferred from a remote computer (e.g., a server) to a requesting computer (e.g., a client). The transfer of the program may be by way of data signals embodied in a carrier wave or other propagation medium via a communication link (e.g., a modem, network connection or the like).

System Architecture

Referring now to FIG. 1, FIG. 1 depicts a Bluetooth™ piconet 100, including a master, host computer 200, which implements a wired/wireless Bluetooth™ communications interface. As known to those skilled in the art, a piconet describes a collection of devices connected via Bluetooth™ technology in an ad hoc fashion. A piconet is initialized with two connective devices, such as for example, a portable personal computer and a mobile phone. The number of devices which can participate in a piconet is limited to eight units. Accordingly, as illustrated in FIG. 1, the various devices, including headset 110, joystick 120, mouse keyboard 130, personal digital assistant (PDA) 140, laptop computer 150, fax machine 160 and printer 170, may participate in a piconet with host computer 200.

As described above, piconets, such as piconet 100 as depicted in FIG. 1, are designed as wire replacement technologies for implementing such networks as depicted in FIG. 1 without the need of wires for interconnecting devices. As such, a host computer would merely await page requests from the various devices in order to establish a connection between the host computer 200 and an authorized device, such as for example, headset 110. Unfortunately, Bluetooth™ enabled devices, such as for example, headset 110, are subject to various interference problems. As interference occurs, the host device may lose its connection with the Bluetooth™ device. Furthermore, interference problems may result in lost or dropped data packets from the Bluetooth™ connection between devices. In the case of a Bluetooth™ audio headset connected to a portable computer, the lost or dropped data packets would result in crackle or pops or gaps in the audio stream received at the headset.

Accordingly, as interference levels are detected, they can eventually reach the limit of intolerable interference within the Bluetooth™ devices, such that even the frequency hopping and error correction algorithms enabled by Bluetooth™ devices is not sufficient to overcome the interference problems. As a result, the present invention describes Bluetooth™ devices which implements a baseband controller, which enables a wired/wireless Bluetooth™ communications interface. Consequently, the various Bluetooth™ devices may either communication in a wireless fashion with a host device or be connected with the host device via a wired link.

As such, the wire link may be used whenever desired and is, in fact, required when a transmission data error rate between the host device and the various Bluetooth™ devices exceeds a pre-determined level. For example, in the case of a Bluetooth™ device transmitting audio data, an error rate of <1% may be established as the threshold error rate. Error rates in data traffic result in slowed performance of the Bluetooth™ link as it retransmits data until errors are corrected. In one embodiment, performance drops of >20% may necessitate switching from a wireless link to a wired link.

However, the various baseband controllers within the devices utilize the same communication methodology as conventional Bluetooth™ devices. Nevertheless, communication of voice and data is now provided between the devices using a wired link. In certain embodiments, the Bluetooth™ device may encounter excessive network interference requiring switching to a wired communications mode. When a wire is not currently being utilized, the devices may either direct themselves or require the host device to notify a user to connect a wire link between the devices to enable the wired communications mode. However, once the communication interference has subsided, the user can be notified to remove the wired link, if desired, and return to wireless (radio frequency (RF)) communication between the devices. In one embodiment, the configuration change may be done automatically by the system according to predefined preference settings.

Figure 2:
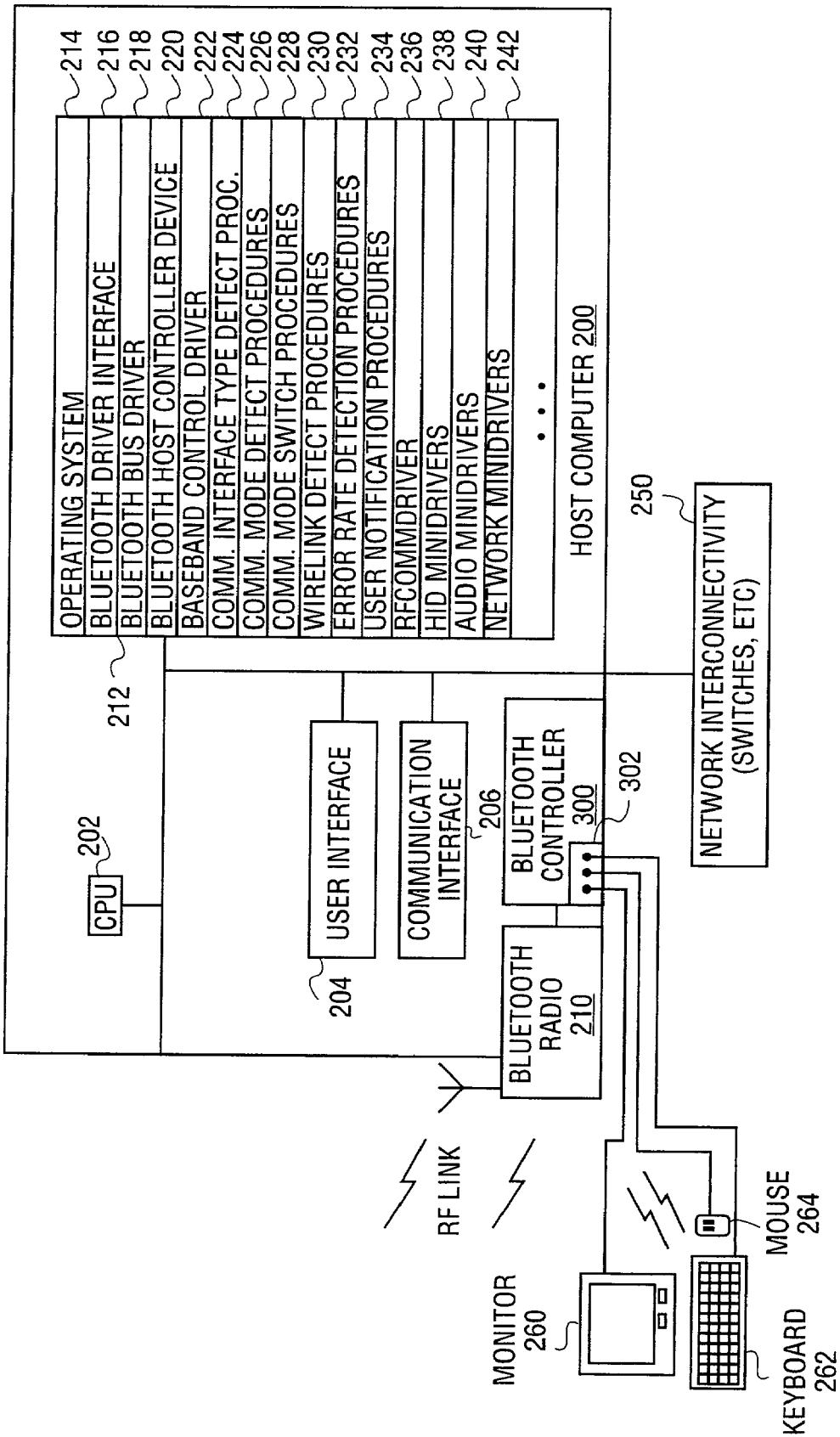
FIG. 2 depicts a block diagram further illustrating the host computer, as depicted in FIG. 1, in accordance with the further embodiment of the present invention.

Referring now to FIG. 2, FIG. 2 further illustrates the host computer 200, as depicted in FIG. 1, in accordance with a further embodiment of the present invention. As depicted, the host computer 200 includes a CPU 302, a user interface 204, a communications interface 206, as well as a memory 212. However, the host computer 200 is implemented utilizing a Bluetooth™ controller 300, which includes a wire link connection port 302 in order to implement a wired/wireless interface, either via wire link port 302 or Bluetooth™ radio 310.

Although the host computer 200 is illustrated using the Bluetooth™ controller 300, those skilled in the art will recognize that each of the Bluetooth™ enabled devices, such as monitor 260, keyboard 262 and mouse 264 also include a Bluetooth™ control and Bluetooth™ radio as depicted in FIG. 2. Accordingly, the Bluetooth™ enabled monitor 260, keyboard 262 and mouse 264 can be utilized by the host control in order to provide a user interface without the need for interconnected wires between the host computer 200 and the Bluetooth™ devices. However, for the reasons described above, data transmission errors may be incurred during times of high interference levels.

Consequently, when interference levels exceed a pre-determined level, it may be necessary for a user to interconnect the various Bluetooth™ devices with a wired link to the wired link port 302 of the Bluetooth™ controller 300. The various devices may themselves determine when excessive interference levels are detected and notify the user to make the wired connection. Alternatively, the Bluetooth™ controller 300 may make such determinations and notify the user to interconnect the wire link devices. In other embodiments, the detection of excessive error conditions resulting in a switch from wireless to wired transmission can be made automatically by either the device or the Bluetooth™ controller. As a result, the Bluetooth™ enabled devices will switch to a wired communications mode once notified by the Bluetooth™ controller 300 of a host device 200.

Referring again to FIG. 2, the memory 212 of the host computer 200 may be implemented as RAM (random access memory), SRAM (synchronous random access memory), SDRAM (synchronous data random access memory) or a combination of RAM and non-volatile memory, such as one or more memory modules, storage volumes or magnetic disc storage units. The memory can contain any of the following:

an operating system 214, which includes for example, windows driver model (WDM drivers) such as the human interface device (HID) class driver, streaming media windows drivers model, as well as the network driver interface specification supported by the operating system, such as for example, Winsock, transmission communication protocol (TCP), Internet protocol (IP) (TCP/IP);

Bluetooth™ driver interface 216;

Bluetooth™ host controller driver 220;

base band control driver 222;

communications interface type detection procedures 224;

communications mode detection procedures 226;

communications mode switch procedures 228;

wire link detection procedures 230;

error rate detection procedures 232;

user notification procedures 234;

RF.com driver 236;

human interface device (HD) mini-drivers 238;

audio mini-drivers 240;

network mini-drivers 242; and other procedures and files.

Accordingly, the various procedures and drivers included in the host computer memory 212 will be described in further detail below within the Software Architecture description.

Figure 3:
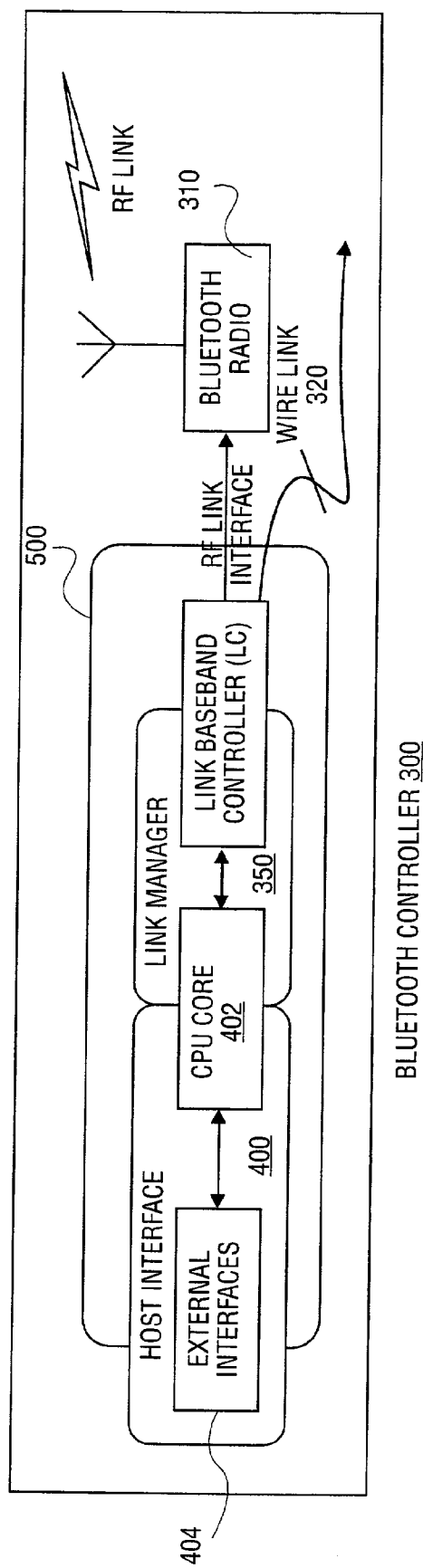
FIG. 3 depicts a block diagram illustrating the Bluetooth™ controller, as illustrated in FIG. 2, in accordance with one embodiment of the present invention.

Referring now to FIG. 3, FIG. 3 further illustrates the Bluetooth™ controller 300, as depicted in FIG. 2, in accordance with a further embodiment of the present invention. As depicted, the Bluetooth™ controller 300 includes an analog portion as the Bluetooth™ radio 310, which is utilized to communicate with the various Bluetooth™ enabled devices, as well as the digital portion, the link controller (Bluetooth™ baseband controller) 500. Accordingly, the Bluetooth™ baseband controller 500 performs the digital signal processing functions of the Bluetooth™ controller using various signal processing hardware. The Bluetooth™ controller 300 further includes a CPU (central processing unit) core 360, which is optional, but is however beneficial, in order to avoid interface problems with a personal computer CPU. The CPU core 402 is further utilized to interface between external interfaces 404, which provide a host interface 400 to the various additional devices of the host computer 200.

As such, the baseband controller 500 includes hardware for performing baseband processing and basic protocols close to the physical layer, such as for example, ARQ (automatic request repeat) protocol and FEC (forward error control) coding. Hence, the baseband controller 500 incorporates all hardware required to interface the Bluetooth™ controller 300 to the Bluetooth™ radio environment. Generally, command responses and data are transferred between Bluetooth™ units across the radio interface in packet format. In addition, the baseband controller 500 is generally responsible for quality of service parameters, asynchronous transfers with guaranteed delivery, synchronous transfers audio coding and encryption.

Referring again to FIG. 3, the link manager 350 is a software entity which carries out protocols, such as link set-up, authentication link configuration and the like. The link manager discovers other remote link managers and communicates with them via the link management protocol to perform service provider role and uses the services of the underlying baseband controller. The service provided includes name requests, which may be up to 16 characters in length, link address inquiries, connection set-up, authentication, link mode negotiation and set-up, such as for example, data or data invoice, setting devices in sniff mode, hold mode, park mode and active mode.

Figure 4:
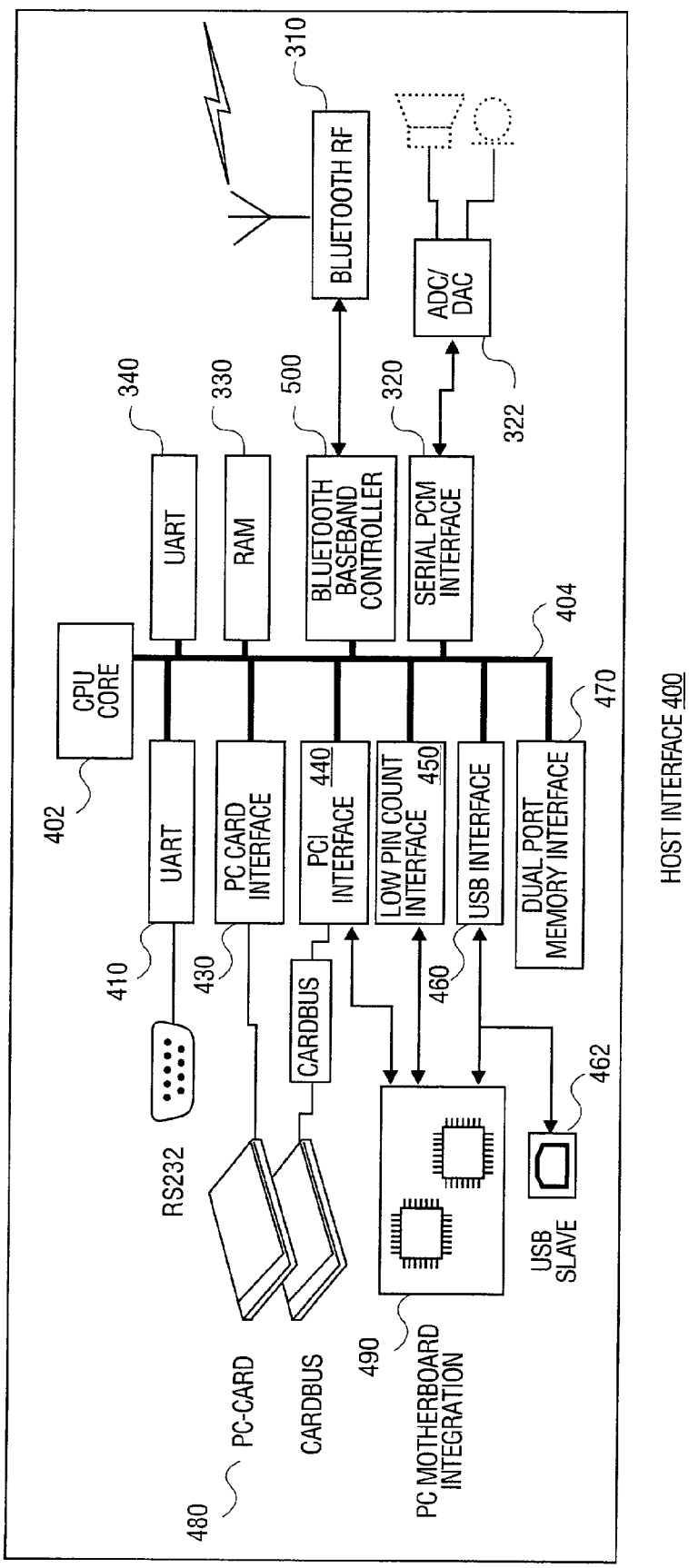
FIG. 4 depicts the host interface, as depicted in FIG. 3, in accordance with a further embodiment of the present invention.

Referring now to FIG. 4, FIG. 4 depicts host interface 400, as depicted in FIG. 3, in accordance with one embodiment of the present invention. The host interface (HF) 400 includes hardware and software, which interfaces the Bluetooth™ controller 300 to a host, such as for example, host device 200, as depicted in FIG. 2. The primary function of HIF 400 is to provide services of the lower layers (via the link manager) in a format suitable for the host device.

Accordingly, the various external interfaces are depicted in FIG. 4, which may include for example, PC card interface 430, PCI (peripheral component interconnect) interface 440, low pin out pin count interface 450, USB interface 460 and dual port memory interface 470. These devices may implement and support PC card bus RS 232, PC mother board integration, as well as USB slave 462. As such, the Bluetooth™ controller firmware implements the baseband link management protocol. The drivers control the radio 310 using the Bluetooth™ host controller interface 400, which is accessed through an appropriate transport interface, as will be described in further detail below.

Figure 5:
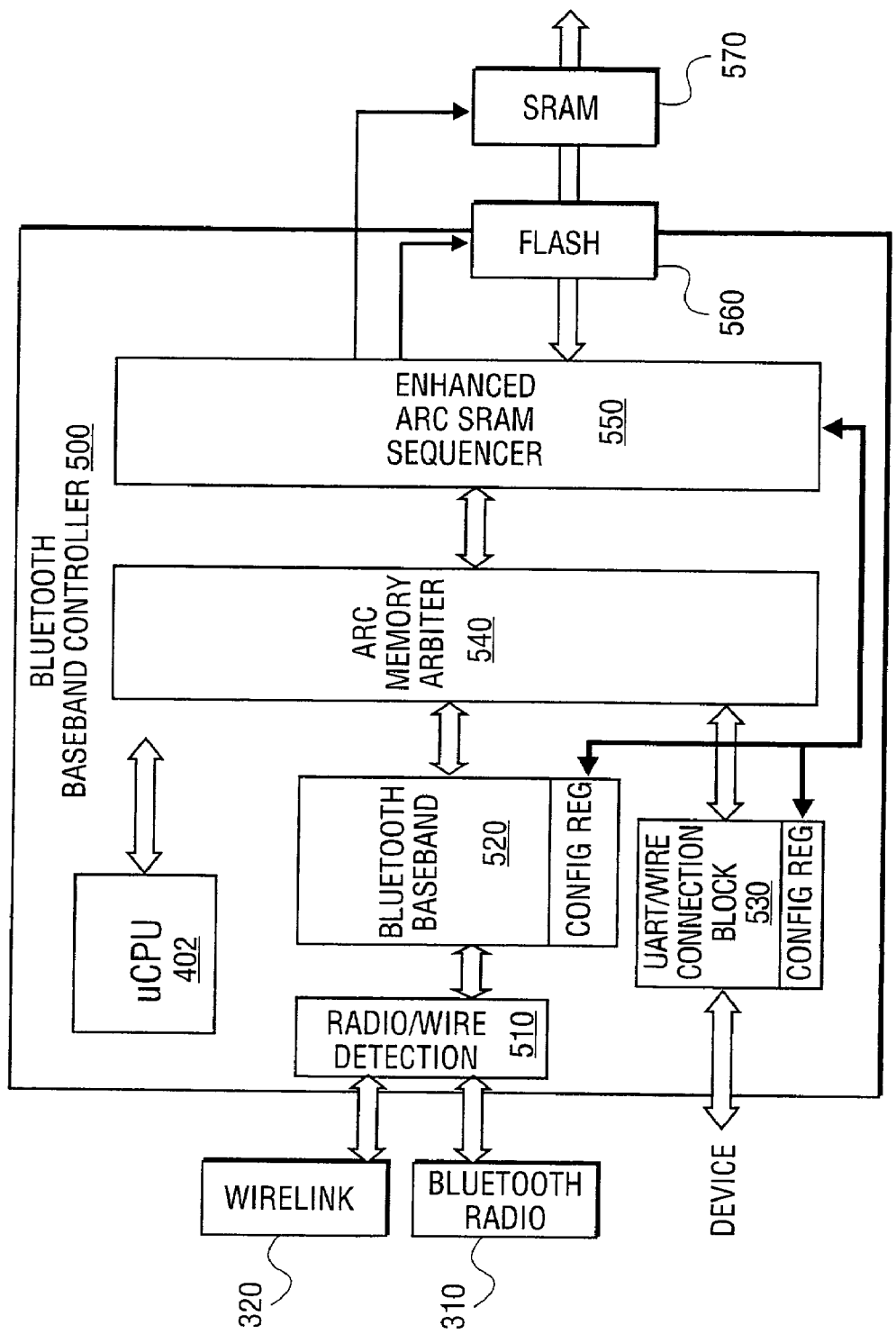
FIG. 5 depicts a block diagram further illustrating the Bluetooth™ baseband controller, as depicted in FIG. 3, in accordance with the further embodiment of the present invention.

Referring now to FIG. 5, FIG. 5 further illustrates the Bluetooth™ baseband controller, as depicted in FIG. 4. The Bluetooth™ baseband controller includes a processor 402 along with memory arbiter 540, SRAM sequencer 550, flash memory 560 and SRAM 570. However, in contrast to conventional baseband controllers, the Bluetooth™ baseband controller 500 includes Bluetooth™ baseband 520, which utilizes radio/wire detection block 510 in order to determine a communications mode of the respective device and to determine whether a wire link between a host device and the Bluetooth™ device is connected. As such, the Bluetooth™ baseband 520 includes firmware for performing the radio/wire detection functionality in order to perform the baseband control driver procedures 222-230, as depicted in FIG. 2.

Accordingly, wire connection block 530 is utilized by the Bluetooth™ baseband controller 500 in order to provide a physical wire link to a slave device. Therefore, when interference levels exceeds a pre-determined level, a host device can notify a user to connect a wire link between the device and a host device via wire connection block 530. Consequently, using wire link Bluetooth™ devices can avoid unduly interference levels and communicate via the wire link until the interference levels have subsided. Once interference levels have subsided, the various devices can notify the user to remove the wire link and resume wireless communication between the various devices. Alternatively, switching between modes is performed automatically according to the detected interference levels.

Software Architecture

The software architecture for implementing Bluetooth™ devices is based on the concept of treating the short range radio, such as for example, Bluetooth™ RF 310, as depicted in FIGS. 2-4, as a bus driver. Treating the local radio 310 as a bus controller enables the loading of appropriate device drivers on detection and identification of other Bluetooth™ compliant devices within range. As such, Bluetooth™ devices fall under the following three classes—telephone related devices, traditional PC peripherals and communication/network devices.

In order to support Bluetooth™ peripherals, the software model 600 utilizes the windows driver model (WDMS) human interface (HID) class driver. The HID class driver comes standard from, for example, Microsoft's NT™ 5.0 and 98 operating systems, and provides support for all human interface devices, such as bus list mechanisms. The HID driver is capable of identifying the HID peripheral and loading the corresponding HID mini drivers in a way that is bus independent. The HID class driver must be pointed to a WDM bus driver. Accordingly, by means of the Bluetooth™ WDM bus driver and an HID to Bluetooth™ bus mini driver, the HID class driver can be used to support all human interface devices, such as mice, keyboard, joysticks or the like.

Support for real time voice has been implemented using digital audio hooks in the PC via the streaming media Windows driver model (WDM) defined by Microsoft Corporation of Redmond, Wash. In addition, the network driver interface specification has connection orientation channels at the (NDIS) layer, which targets telephone applications. Finally, in networking applications are implemented by utilizing the Bluetooth™ controller interface as a network interface card (NIC), utilizing a mini driver to interface the NDIS class driver with the Bluetooth™ WDM bus driver.

Figure 6:
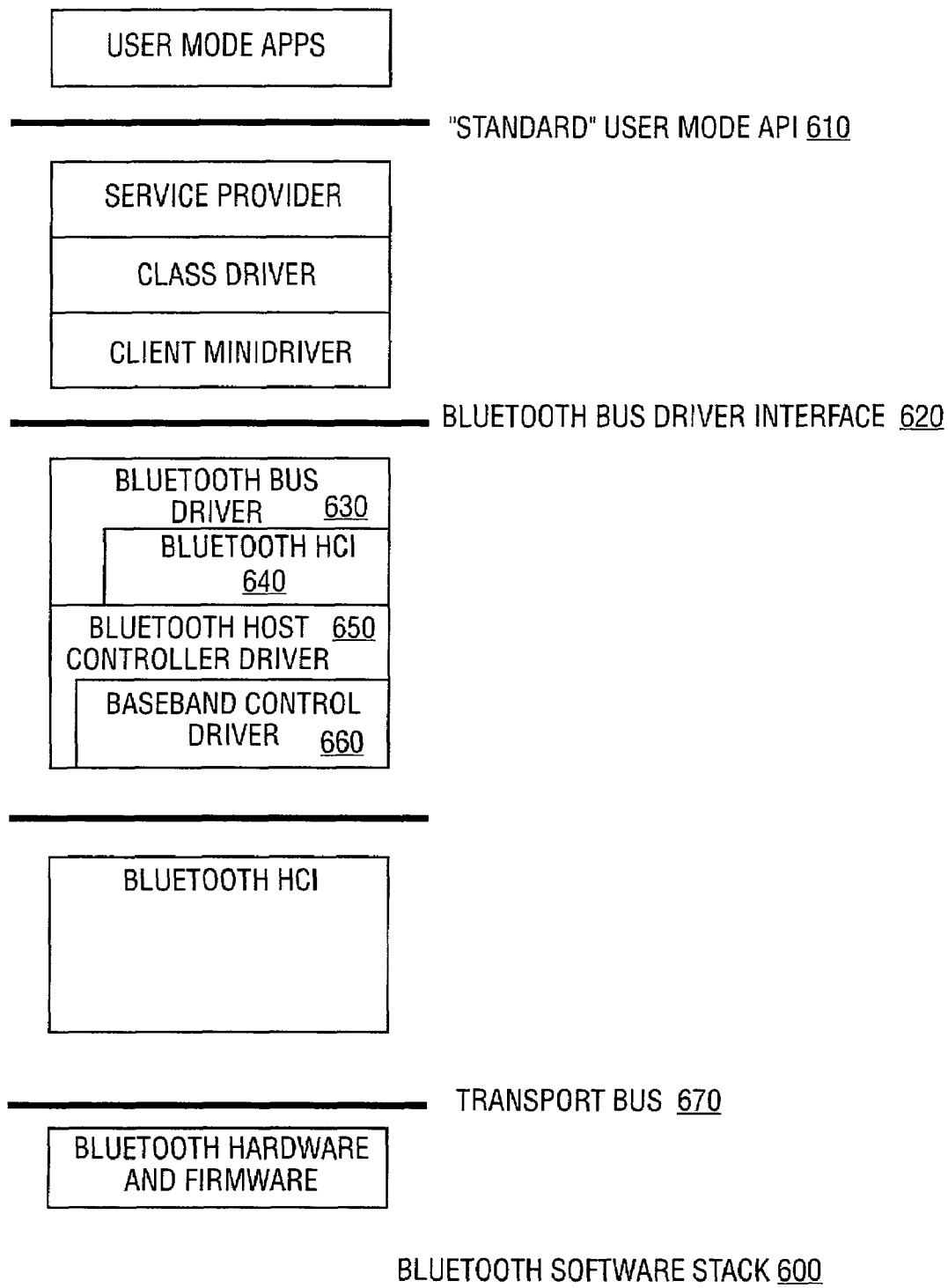
FIG. 6 depicts a Bluetooth™ software stack, implementing a Bluetooth™ baseband controlled driver to provide a wired/wireless Bluetooth™ communications interface, in accordance with an exemplary embodiment of the present invention.

Referring now to FIG. 6, FIG. 6 depicts the Bluetooth™ software stack 600. As illustrated, the core of the Bluetooth™ software stack 600 essentially includes the Bluetooth™ bus driver 630, the Bluetooth™ host control interface (HCI) 640 and the Bluetooth™ host controller driver 650. Accordingly, each function class typically includes a client driver that is loaded by the Bluetooth™ bus driver. These client drivers utilize the Bluetooth™ bus driver interface 620 to communicate with the Bluetooth™ bus driver 630 for data and control transfer purposes.

However, in contrast to conventional Bluetooth™ software stacks, Bluetooth™ software stack 600 includes a Bluetooth™ or link manager control driver 660, which is utilized to implement the wired/wireless communications interface, as described herein. However, those skilled in the art will recognize that the wired/wireless interface communications methods described herein may be implemented anywhere within the Bluetooth™ bus driver interface 620 software stack 600, as well as within the Bluetooth™ controller firmware, depending on the desired implementation specific details of the system designer.

Figure 7:
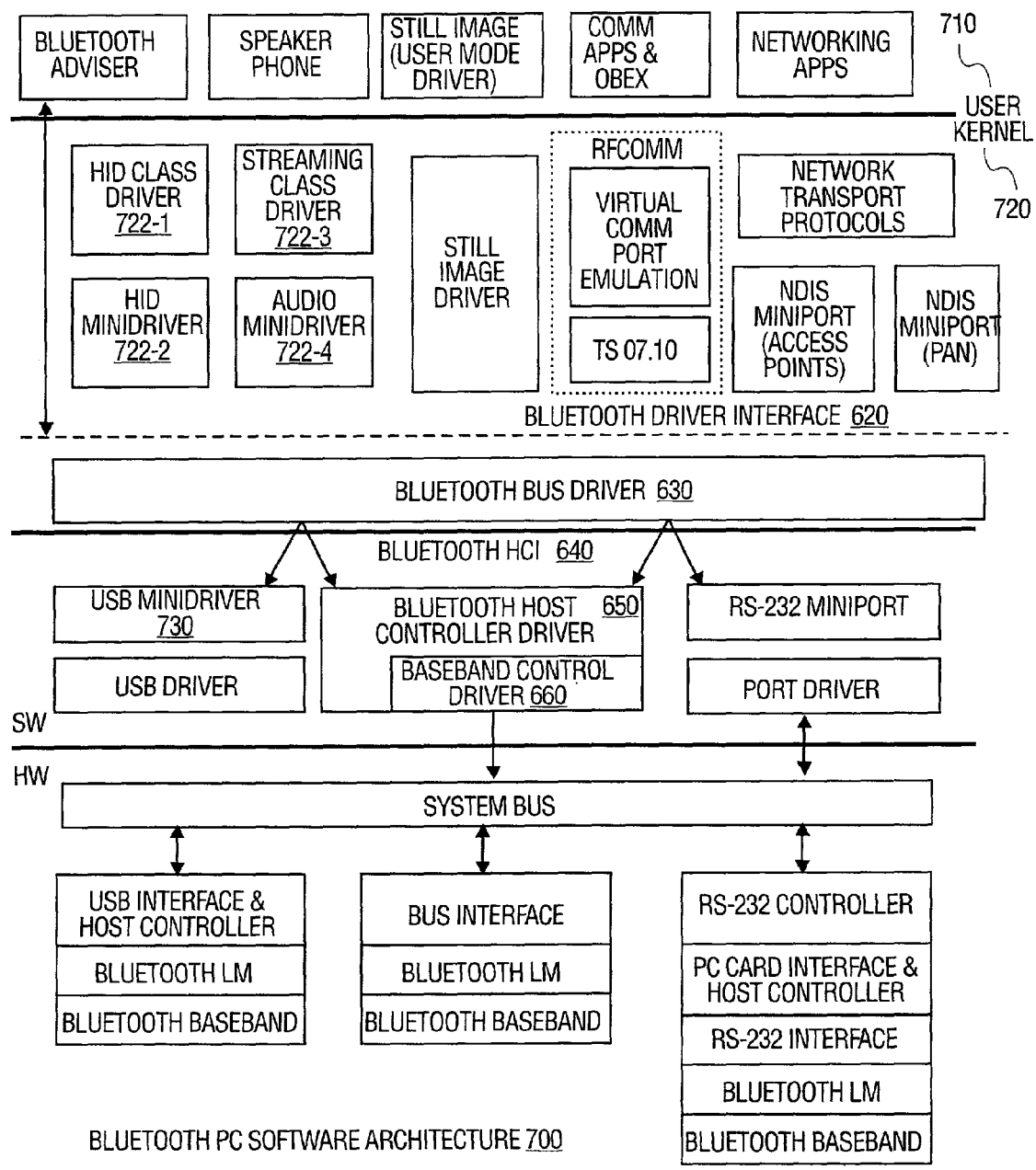
FIG. 7 depicts a block diagram illustrating a Bluetooth™ software architecture utilizing the Bluetooth™ baseband control driver, as depicted in FIG. 6, and in accordance with a further embodiment of the present invention.

As such, a Bluetooth™ software stack 600, as depicted in FIG. 6, is further illustrated in the Bluetooth™ software architecture 700, as depicted in FIG. 7. As illustrated, user mode 710 programs interact with the kernel 720 using a variety of programmer interfaces, including, for example, WIN32™, Winsock™, RealTime™ applications server (RAS) and telephone application program interface (TAPI). As such, Bluetooth™ kernel mode drivers 720 fit into the framework exposed by Windows 98™ and Windows 2000™ for third party drivers. Although the Bluetooth™ software architecture 700, as depicted in FIG. 7, is illustrated with reference to application programming interfaces specific to Windows 98™ and Windows 2000™, those skilled in the art will recognize that various third party drivers available in computing operating systems, such as for example, Unix, Linix or the like, may be provided in order to provide and implement Bluetooth™ device specific interfaces.

Bluetooth™ kernel mode drivers 720 fall into two categories: one set of drivers provide the infrastructure on which the second set of client Bluetooth™ drivers are layers. Infrastructure drivers are the ones below the Bluetooth™ driver interface. Bluetooth™ client drivers interface to the main specific interfaces in the operating system. As illustrated, FIG. 7 depicts the software architecture for support, including networking communications, TAPI, HID, still image and audio. However, those skill in the art will recognize that this is not an exhaustive list. In addition, the Bluetooth™ host controller implements a baseband controlled driver, as illustrated in FIG. 6.

Accordingly, as illustrated in FIG. 2, within the memory of the host device 200, the baseband control driver procedures 222 enable the wireless/wired communications interface, as referred to above, within Bluetooth™ enabled devices. As such, the communication interface type detection procedures 224 are utilized by the baseband control driver procedures 222 in order to determine whether the slave device is configured with a wired/wireless communications interface. When such is the case, the procedures can use the communications mode detection procedures 226 to determine whether a wire link is being used for communication between the devices.

As such, when a wireless mode is detected, the error rate detection procedures 232 will monitor packet error rates to determine interference levels. When the interference levels exceed a pre-determined level, the user notification procedures 234 will be utilized to notify a user to connect a wire link between the devices. Once a connection is made, the baseband control driver procedures 222 will invoke the communicator mode switch procedures 228 to switch communication from the wireless mode to the wired mode via wire link 320.

In addition, the host device 200 includes a variety of mini drivers (232-240) for implementing the Bluetooth™ specific devices. In addition, the user mode applications include a Bluetooth™ advisor, as provided as a single point of control for all Bluetooth™ devices. It is generally targeted to be the end user visible application for Bluetooth™ related configurations. Within the infrastructure drivers described, the USB mini driver 730, is a client of Microsoft's USB stack and communicates using the USB driver interface (USBDI). Accordingly, the driver provides a transport mechanism for access to the Bluetooth™ host controller interface 640. The Bluetooth™ HCI 640 abstracts driver abstracts the HIC interface from the Bluetooth™ bus driver 630 and publishes a much simplified connection model. The Bluetooth™ bus driver 630 is one of the core components of the Bluetooth™ stack. For Bluetooth™ purposes, the RF interface is modeled as a peripheral bus on which Bluetooth™ devices come and go.

The Bluetooth™ bus driver 630 is the bus driver for the RF bus and is responsible for the following functions: device enumeration, connection maintenance, client driver loading, implementation, segmentation, reassembly and protocol multiplexing, support for RF bus driver interface (RFBDI) management of radio transmissions and management of power states in the Bluetooth™ device. RF communication driver is a client of the Bluetooth™ bus and is responsible for implementing comport import immolation over Bluetooth™. It is generally used for dial-up networking and speech applications. It can also be used as a transport for objects exchange (OBEX) insert and implementations. OBEX enables synchronization applications between various Bluetooth™ devices, such as between a notebook computer and a phone.

The HID mini drivers 722 provide support for RD via the phone through an HID mini driver that interfaces with the HID class driver and the Bluetooth™ bus driver 630. These interfaces are also utilized in order to enable support for other HID devices in Bluetooth™, including keyboards, joysticks, mice and game pads. An audio mini driver is also provided that interfaces with the streaming class driver from the Microsoft operating system. It is utilized as a capacitor from the system audio devices to the Bluetooth™ interface, where it will be transported to a headset, cellular phone or another notebook computer. Network mini drivers also are provided in order to provide LAN access points, as well as conference table functions. Accordingly, the procedural methods for implementing the wired/wireless communications interface as described herein are now provided.

Operation

Figure 8:
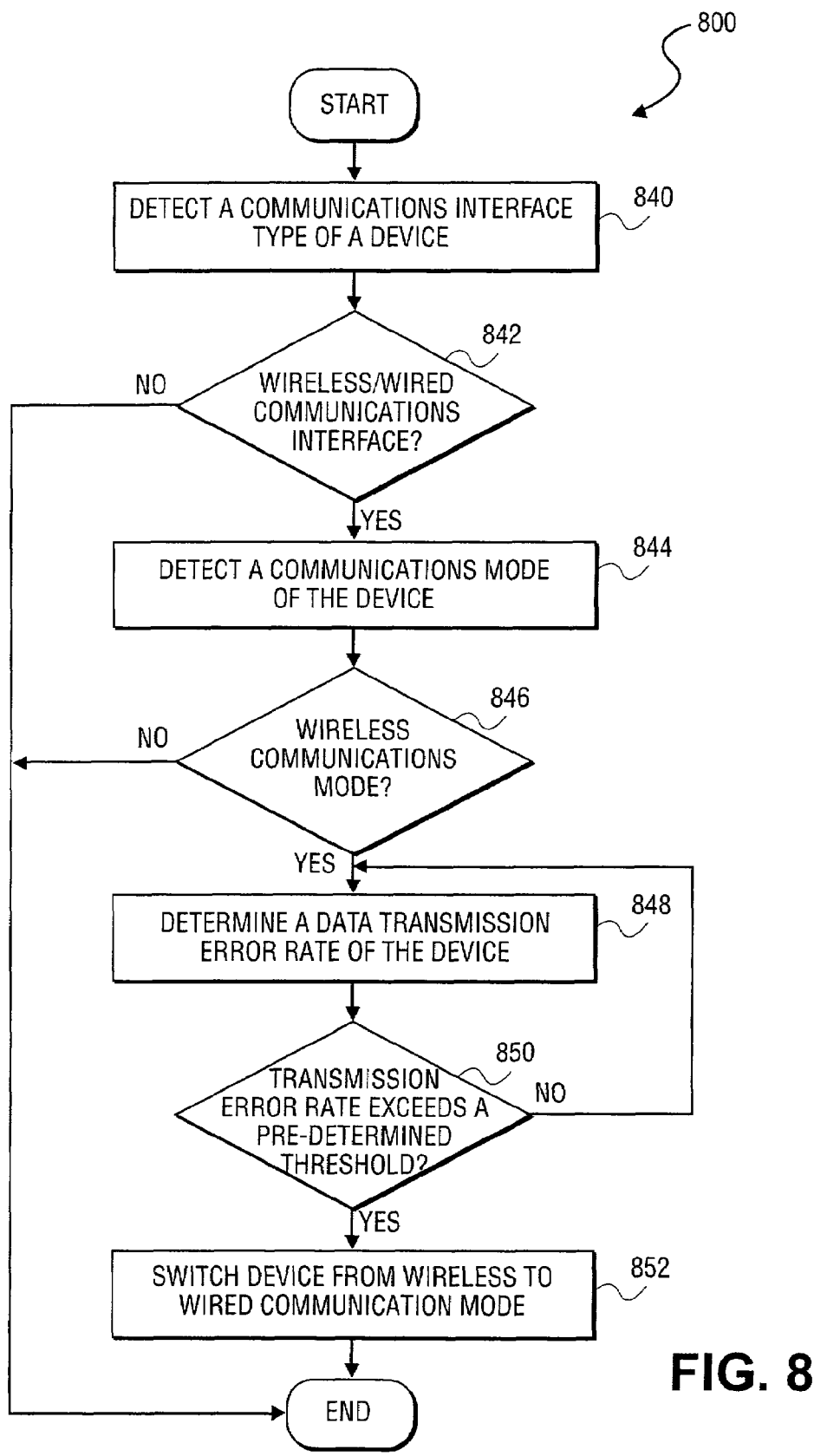
FIG. 8 depicts a flowchart illustrating a method for implementing a wired/wireless Bluetooth™ communications interface, in accordance with one embodiment of the present invention.

Referring now to FIG. 8, FIG. 8 depicts a method 800 for implementing a wired/wireless Bluetooth™ communications interface within, for example, the Bluetooth™ devices as depicted in FIGS. 1 and 2. As described above, the various wired/wireless interface procedures, as described herein, may be implemented utilizing the baseband control driver 222, as depicted in FIGS. 2, 6 and 7. Alternatively, the wired/wireless interface procedures may be implemented utilizing software procedures within the link manager 350, as depicted in FIG. 3. Otherwise, the interface procedures may be implemented utilizing baseband controller firmware within baseband controller 500, as depicted in FIG. 5.

Accordingly, utilizing the wired/wireless interface techniques describes herein, Bluetooth™ enabled devices may utilize a wire link to communicate with a Bluetooth™ host device when environment interference exceeds a pre-determined level, which prohibits wireless communication between the various devices. However, as described herein, communication continues via the Bluetooth™ baseband controller, with the exception that the Bluetooth™ radio is no longer utilized as the various information packets of data invoice information are transmitted through a wire link that connects the various devices.

Referring again to FIG. 8, at process block 840, a communications interface type of a device is detected. In the embodiments described, the communications interface type is one of a wireless communications interface and a wired/wireless communications interface. As described herein, the wireless communications interface refers to conventional Bluetooth™ baseband controllers, which are limited to a wireless interface. However, Bluetooth™ enabled devices utilizing baseband controllers, as described herein, will implement a wireless/wired communications interface.

Accordingly, at process block 842, when a wired/wireless communications interface is detected, at process block 844, a communications mode of the device is detected. In one embodiment, the interface type and the communications mode of the device are determined by querying a communications interface type state field and a wired link state field, which are set during, for example, start-up of the device. As described herein, the communications mode of the device includes wireless communications mode and a wired communications mode for dual wired/wireless communications interfaces.

Next, at process block 846, it is determined whether the device is functioning in a wireless communications mode. When such is the case, at process block 848, a data transmission error rate of the device is determined. Once determined, at process block 850, it is determined whether the data transmission error rate exceeds a pre-determined threshold error rate. As such, process block 848 is repeated until the error rate exceeds a pre-determined threshold. Accordingly, at process block 852, when the data transmission error rate exceeds the pre-determined threshold error rate, the wireless communications mode of the device is switched from the wireless communications mode to a wired communications mode. Alternatively, an environment interference level may be determined in order to decide whether to initiate communication in a wired communications mode.

As such, the device will now communicate using the baseband controller via a wired link interconnecting device with a host device. As indicated, the various procedural methods may either be implemented solely within the Bluetooth™ device or within a host device, such that a host device could send a broadcast packet to the various Bluetooth™ devices to begin functioning in the wired communications mode. In addition, when a wire link is not present, the host device could notify a user to plug in the required wired link.

Alternatively, such notification could be provided via the devices, themselves, such that the host device begins functioning in a wired communications mode upon notification from a device or when plugin of the wired link is detected. The various baseband controlled driver procedures are described with reference to FIG. 2 and include communications interface procedures 224, communications mode detection procedures 226, communications mode switch procedures 228, wire link detection procedures 230, error rate (interference level) detection procedures 232 and user notification procedures 234, which may be implemented solely in the host computers as well as in the various Bluetooth™ enabled devices utilizing the Bluetooth™ software stack or baseband controller firmware.

Figure 9:
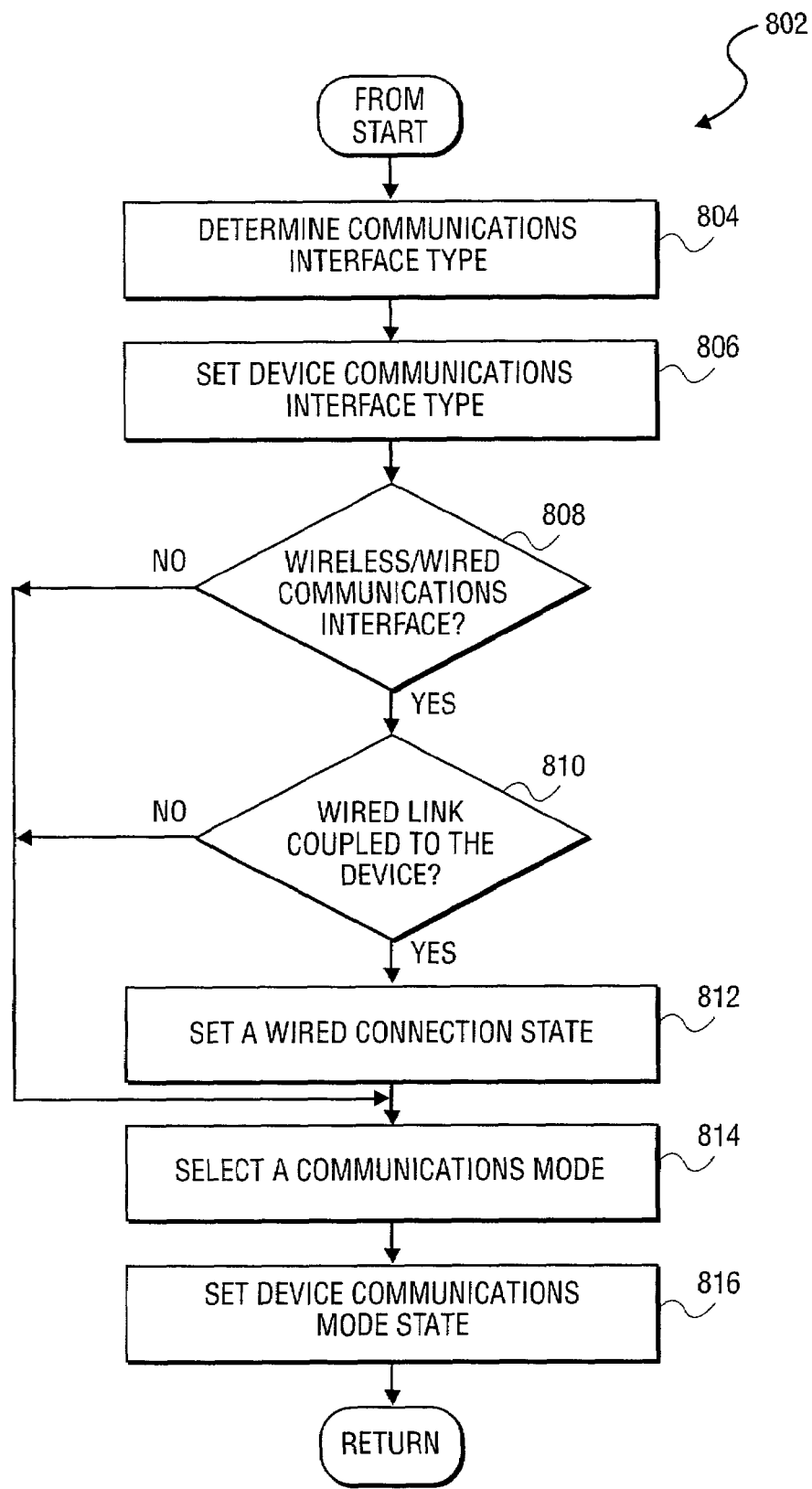
FIG. 9 depicts a flowchart illustrating an additional method, which is performed prior to detection of a device communications type, in accordance with a further embodiment of the present invention.

Referring now to FIG. 9, FIG. 9 illustrates a method 802 which is performed prior to detection of the device communications interface type. Accordingly, at process block 804, a device communications interface type is determined. Once the interface type of the device is determined, a device communications interface state is set according to the determined communications interface type. Next, at process block 808, it is determined whether a wired/wireless communications interface is detected as the communications configuration of the device. When such is the case, at process block 810, it is determined whether a wired link couples the device to a host device. When such is the case, at process block 812, a wired connection state is set. Next, at process block 814, a communications mode of the device is selected according to the device communications configuration state, the wired connections state and a radio frequency interference level.

Finally, at process block 816, a device communications mode state is set according to the selected communications mode. As described above, the communications mode will be selected as a wireless communications mode when interference levels are at a normal level. However, when interference levels exceed a pre-determined threshold error level, the device will switch to a wired communications mode assuming a dual wired/wireless interface is supported. As will be described in detail below, when a wire link is not present during times of excessive interference, a user of a dual wired/wireless interface device will be notified to connect the device to a host device via a wire link.

Figure 10:
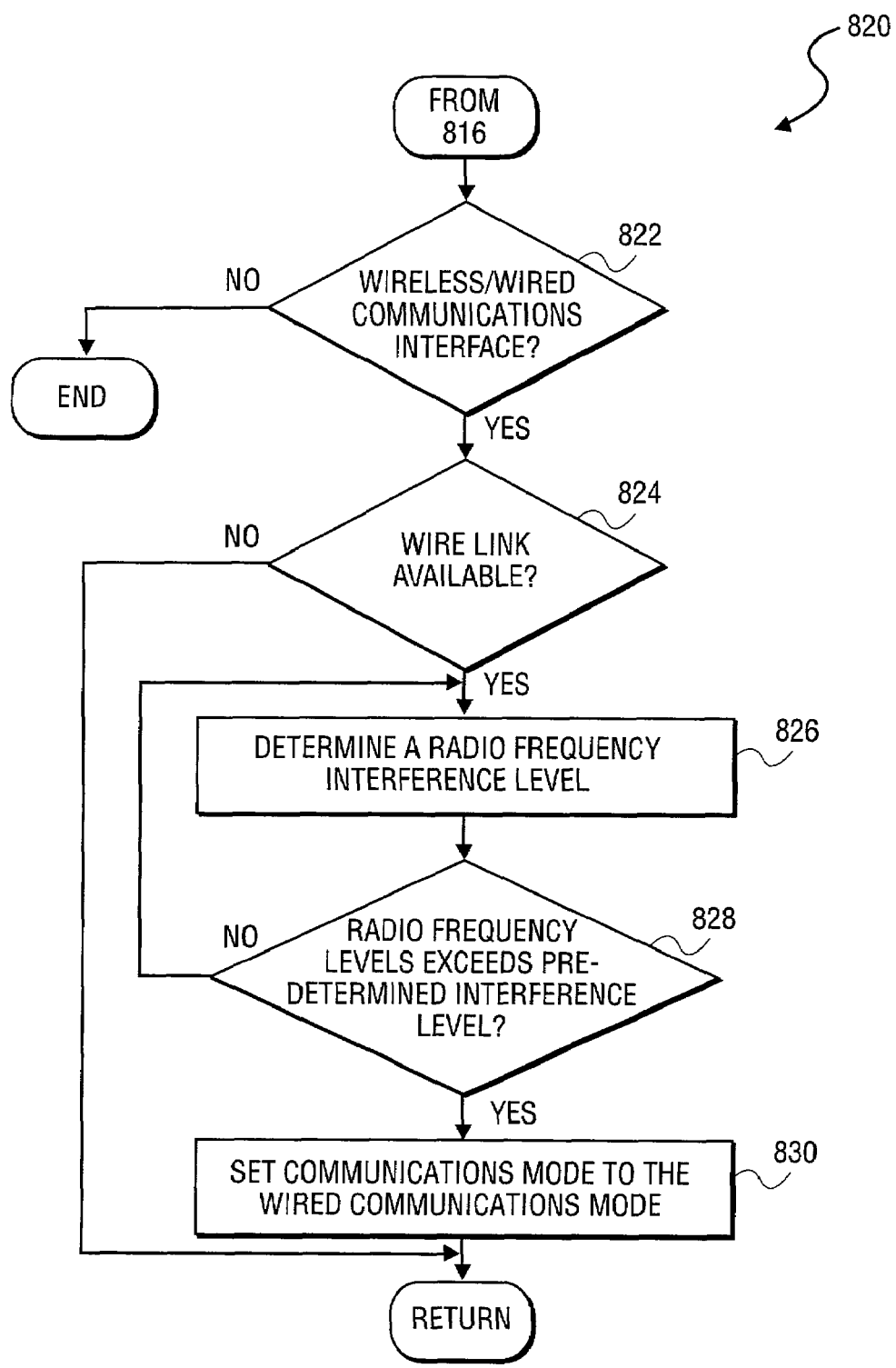
FIG. 10 depicts a flowchart illustrating an additional method for selecting a communications mode of the wireless device, in accordance with a further embodiment of the present invention.

Referring now to FIG. 10, FIG. 10 depicts a flowchart illustrating an additional method 816 for selecting the communications mode of process block 816, as depicted in FIG. 10. At process block 822, it is determined whether a wireless/wired communications interface of the device is detected. When such is the case, at process block 824, it is determined whether a wire link couples the device to a host device. When such is the case, at process block 826, a radio frequency interference level is determined. Once determined, at process block 828, it is determined whether the radio frequency interference level exceeds a pre-determined interference level. As such, process block 826 is repeated until the radio frequency interference level exceeds the pre-determined interference level. As such, once this case is determined, the communications mode of the device is set to the wired communications mode at process block 830.

In one embodiment, process blocks 826 and 828 are optional. In this embodiment, when a wire link is detected, the device will continually function in the wired communications mode. However, in the embodiment described with reference to FIG. 10, the device can automatically switch between communication modes (wired/wireless), as dictated by the interference levels, without notifying the user. Alternatively, the user may be notified to disconnect the wire link and enjoy wireless freedom provided by the wireless communications mode.

Figure 11:
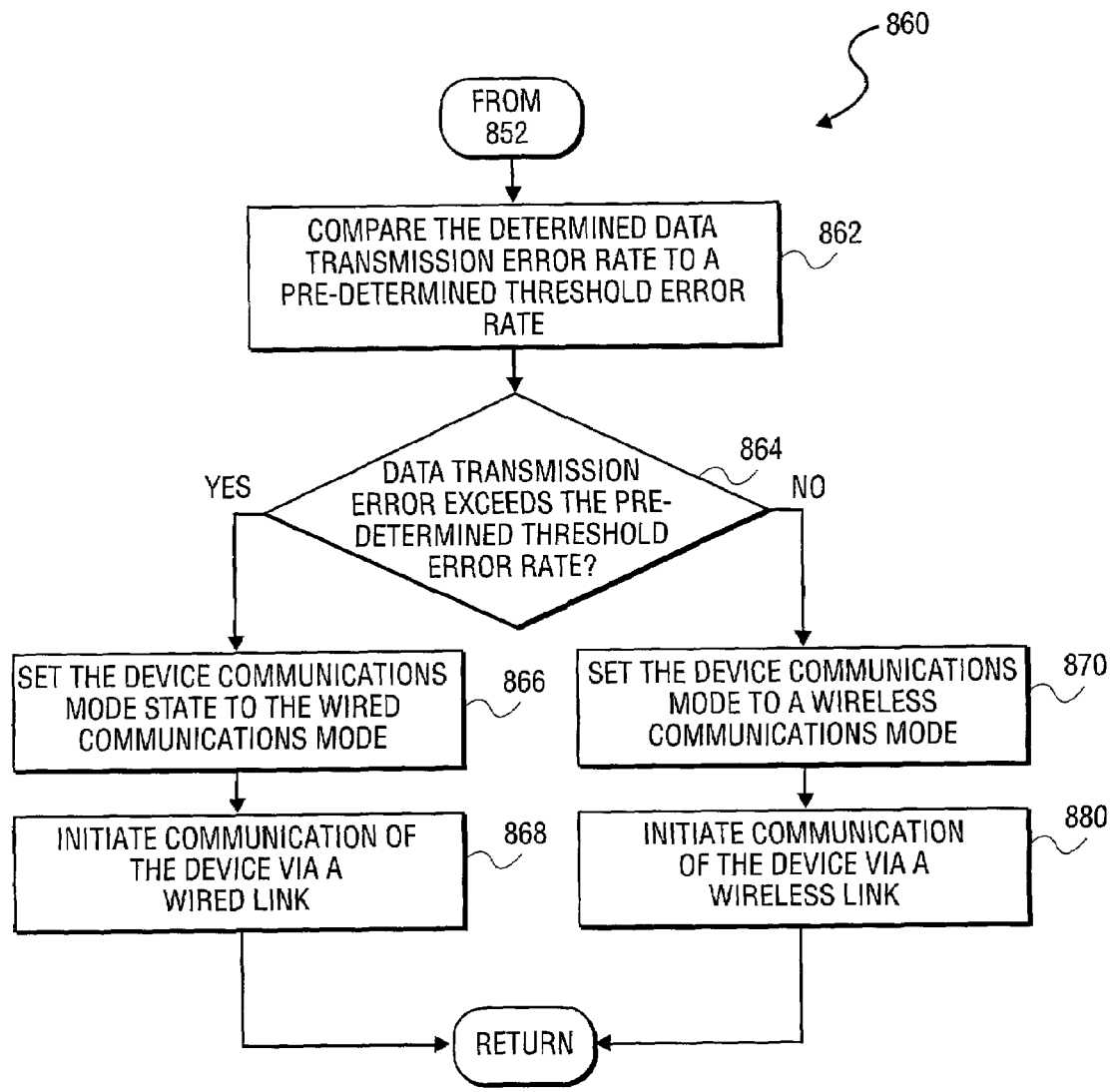
FIG. 11 depicts a flowchart illustrating a method for switching a device communications mode from one of a wired communications mode to a wireless communications mode, in accordance with an exemplary embodiment of the present invention.

Referring now to FIG. 11, FIG. 11 depicts a flowchart illustrating a method for switching the device communications mode. At process block 862, the determined data transmission error rate is compared to a pre-determined threshold error rate. Next, at process block 824, it is determined whether the data transmission error rate exceeds the pre-determined threshold error rate. When such is the case, the device communications mode is set to the wired communications mode. Once set to the wired communications mode, at process block 868, communication of the device is initiated via a wire link between the device and a host device. Otherwise, at process block 870, the device communications mode is set to a wireless communications mode. Finally, at process block 880, communication of the device is initiated via a wireless link, such as for example, Bluetooth™ radio 310.

In alternate embodiments, during communication of the device according to the wired communications mode, one of the device or the host device will continue monitoring of the device interference levels or transmission error rates in order to determine when interference levels leading to increased transmission error rates have subsided. As such, once interference levels and corresponding data transmission error rates have fallen within an accepted threshold level, a user may be notified to disconnect the wire link between the device and the host device. Consequently, once the wire link is removed, the devices can resume functioning in a wireless communications mode, thereby enabling a user of the device to move around freely without being constricted by wires. As a result, this process may be continually repeated as interference levels are encountered by the user.

In a further alternate embodiment, a wire link is continuously connected between the wireless device and the host device. In such an embodiment, one of the host device or the wire device determines the interference levels within the environment and selects the communications mode accordingly. As indicated above, during times of excess interference levels, either of the devices will switch to the wired communications mode. However, when the interference level returns to an acceptable range, the devices may return to a wireless communications mode automatically, without alerting the user. This embodiment is provided in order to enable the user to have continued, uninterrupted communication.

Nonetheless, the user is restricted to having a wire link in place at all times during communications between the devices. However, the user can, at their option, remove the wire links and function in a wireless communications mode until an excessive interference level is detected, at which time the user may be requested to connect the wire link. As recognized by those skilled in the art, the various implementation details are up to the respective system designers and will include considerations relative to user preference for eliminating wire connections, as well as considerations for continuous communications and uninterrupted communication between the various devices.

As such, the process described herein will be repeated, requiring connecting a wire link and removing the wire link as necessary, in order to provide continued communication according to either a wired communications mode or a wireless communications mode. Moreover, voice/data communication between devices simply is performed by transmitting voice/data via either a wire link or a radio frequency transmitter within devices without requiring modification to device communication protocols or packet processing. Therefore, a user may continue communication without being subject to inoperable wireless devices during times of excessive interference levels leading to untenable error transmission rates.

Alternate Embodiments

Several aspects of one implementation of the when a wireless/wired communications interface is detected as the communications configuration for providing wired communication in the event of RF interference have been described. However, various implementations of the when a wireless/wired communications interface is detected as the communications configuration provide numerous features including, complementing, supplementing, and/or replacing the features described above. Features can be implemented as part of the wireless device or as part of a computer system in different implementations. In addition, the foregoing description, for purposes of explanation, used specific nomenclature to provide a thorough understanding of the invention. However, it will be apparent to one skilled in the art that the specific details are not required in order to practice the invention.

In addition, although an embodiment described herein is directed to a Bluetooth™ device, it will be appreciated by those skilled in the art that the teaching of the present invention can be applied to other systems. In fact, systems for limited distance wireless communication are within the teachings of the present invention, without departing from the scope and spirit of the present invention. The embodiments described above were chosen and described in order to best explain the principles of the invention and its practical applications. These embodiment were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the present invention to the full extent indicated by the broad general meaning of the terms in which the appended claims are expressed.

The present invention provides many advantages over known techniques. The present invention includes the ability to provide a wired interface to a Bluetooth™ device without the necessity to replace the protocol and foundation of the communications device. For example, a Bluetooth™-enabled keyboard can be used in a standard wireless fashion or it can be built such that it connects to a PC via a cable to perhaps a Bluetooth™ to USB connection. In this example, the user can chose either the wireless mode or can also plug the same keyboard into a USB port in cases where radio traffic is a problem. Accordingly, the present invention provides a back-up method of connecting devices where radio frequency traffic is a problem. In addition, devices are provided with a wired or wireless option. There are many circumstances when a user may not want to (or not be able to) use a wireless device, such as for example, battery depletion or the like. Finally, the present invention provides a mechanism for redundant connection or useful so that connectivity is not lost and protocol device connection does not have to ever change.

Having disclosed exemplary embodiments and the best mode, modifications and variations may be made to the disclosed embodiments while remaining within the scope of the invention as defined by the following claims.

What is claimed is:

1. A method comprising:
   when a wireless/wired communications interface is detected as a communications interface type of a device, detecting a connection state of the device as one of a wireless connection state and a wired connection state;
   when the wireless connection state is detected, determining a data transmission error rate of the device during operation of the device in a wireless communications mode;
   notifying a device user to couple a wire link between the device and a host device to switch the device from the wireless communications mode to a wired communications mode when the data transmission error rate of the device exceeds a pre-determined threshold;

monitoring detected interference levels that increased the data transmission error rate to determine if the detected interference levels have subsided during operation in the wired communications mode; and notifying the device user to disconnect the wire link when the detected interference levels have fallen within an accepted threshold level to resume the wireless communication mode.

2. The method of claim 1, wherein prior to detecting the connection state of the device, the method further comprises:

determining a communications interface type of the device;

setting a device communications interface state according to the determined communications interface type;

when a wireless/wired communications interface is detected as the communications interface type, determining whether a wire link is coupled to the device;

setting a wired connection state according to the determined wired connection;

when a wire link is coupled to the device, selecting a communications mode as one of a wireless communications mode and a wired communications mode according to the device communications configuration state, the wired connection state and a radio frequency interference level; and setting a device communications mode state according to the selected communications mode.

3. The method of claim 2, wherein selecting the communications mode further comprises:

when the device communications interface state indicates a wireless/wired communications interface and the wired connection state indicates presence of a wire link, determining a radio frequency interference level; and when the radio frequency interference level exceeds a pre-determined interference level, setting the communications mode to the wired communications mode.

4. The method of claim 1, wherein prior to detecting the connection state of the device the method further comprises:

querying a device communications configuration state to detect the communications interface type of the device; and when the communications interface type of the device is a wireless/wired communications interface, querying a wired connection state to determine whether a wire link couples the device to a host device.

5. The method of claim 1, wherein notifying the device user further comprises:

comparing the determined data transmission error rate to a pre-determined threshold error rate;

when the data transmission error rate exceeds the pre-determined threshold error rate, setting the device communications mode state to the wired communications mode;

initiating communication of the device via a wire link;

otherwise, setting the device communications mode to a wireless communications mode; and initiating communication of the device via a wireless link.

6. The method of claim 1, wherein notifying the device user further comprises:

comparing the transmission error rate with a pre-determined threshold error rate;

when the transmission error rate exceeds the pre-determined threshold error rate, querying a wired connection state to determine presence of a wire link coupled to the device;

when a wired connection is coupled to the device, switching the device from the wireless communications mode to the wired communications mode;

otherwise, notifying a device user to couple a wire link between the device and a host device; and once the user couples a wire link between the device and the host device, switching the device from the wireless communications mode to the wired communications mode.

7. The method of claim 6, further comprising:

comparing the transmission error rate with a pre-determined threshold error rate;

when the transmission error rate is below the pre-determined threshold error rate, notifying the user to disconnect the wire link between the device and the host device; and once the user disconnects a wire link between the device and the host device, switching the device from the wired communications mode to the wireless communications mode.

8. The method of claim 1, wherein notifying the device user further comprises:

transmitting data, via a wire link, between the device and a host device, utilizing the wired communication mode; and receiving data, via the wire link, from the host device, utilizing the wired communications mode.

9. The method of claim 1, wherein switching the device further comprises switching a host device, coupled to the device via a wire link, from the wireless communications mode to the wired communications mode.

10. A computer readable storage medium including program instructions that direct a computer to function in a specified manner when executed by a processor, the program instructions comprising:

when a wireless/wired communications interface is detected as a communications interface type of a device, detecting a connection state of the device as one of a wireless connection state and a wired connection state;

when the wireless connection state is detected, determining a data transmission error rate of the device during operation of the device in a wireless communications mode;

notifying a device user to couple a wire link between the device and a host device to switch the device from the wireless communications mode to a wired communication mode when the data transmission error rate of the device exceeds a pre-determined threshold;

monitoring detected interference levels that increased the data transmission error rate to determine if the detected interference levels have subsided during operation in the wired communications mode; and notifying the user to disconnect the wire link when the detected interference levels have fallen within an accepted threshold level to resume the wireless communication mode.

11. The computer readable storage medium of claim 10, wherein prior to detecting the connection state of the device, the method further comprises:

determining a communications interface type of the device;

setting a device communications interface state according to the determined communications interface type;

when a wireless/wired communications interface is detected as the communications interface type, determining whether a wire link is coupled to the device;

setting a wired connection state according to the determined wired connection;
when a wire link is coupled to the device, selecting a communications mode as one of a wireless communications mode and a wired communications mode according to the device communications configuration state, the wired connection state and a radio frequency interference level; and
setting a device communications mode state according to the selected communications mode.

12. The computer readable storage medium of claim 11, wherein selecting the communications mode further comprises:
when the device communications interface state indicates a wireless/wired communications interface and the wired connection state indicates presence of a wire link, determining a radio frequency interference level; and
when the radio frequency interference level exceeds a pre-determined interference level, setting the communications mode to the wired communications mode.

13. The computer readable storage medium of claim 10, wherein prior to detecting the connection state of the device the method further comprises:
querying a device communications configuration state to detect the communications interface type of the device; and
when the communications interface type of the device is a wireless/wired communications interface, querying a wired connection state to determine whether a wire link couples the device to a host device.

14. The computer readable storage medium of claim 10, wherein notifying the device user further comprises:
comparing the determined data transmission error rate to a pre-determined threshold error rate;
when the data transmission error rate exceeds the pre-determined threshold error rate, setting the device communications mode state to the wired communications mode;
initiating communication of the device via a wire link;
otherwise, setting the device communications mode to a wireless communications mode; and
initiating communication of the device via a wireless link.

15. The computer readable storage medium of claim 10, wherein notifying the device user further comprises:
comparing the transmission error rate with a pre-determined threshold error rate;
when the transmission error rate exceeds the pre-determined threshold error rate, querying a wired connection state to determine presence of a wire link coupled to the device;
when a wired connection is coupled to the device, switching the device from the wireless communications mode to the wired communications mode;
otherwise, notifying a device user to couple a wire link between the device and a host device; and
once the user couples a wire link between the device and the host device, switching the device from the wireless communications mode to the wired communications mode.

16. The computer readable storage medium of claim 15, further comprising:
comparing the transmission error rate with a pre-determined threshold error rate;
when the transmission error rate is below the pre-determined threshold error rate, notifying the user to disconnect the wire link between the device and the host device; and
once the user disconnects a wire link between the device and the host device, switching the device from the wired communications mode to the wireless communications mode.

17. The computer readable storage medium of claim 10, wherein notifying the device user further comprises:
transmitting data, via a wire link, between the device and a host device, utilizing the wired communication mode; and
receiving data, via the wire link, from the host device, utilizing the wired communications mode.

18. The computer readable storage medium of claim 10, wherein notifying the device user further comprises switching a host device, coupled to the device via a wire link, from the wireless communications mode to the wired communications mode.

19. An apparatus, comprising:
a processor having circuitry to execute instructions;
a communications interface coupled to the processor, the communications interface to transmit data to a host device, and to receive data from the host device;
a connection port coupled to the processor to enable coupling of the apparatus to the host device via a wire link;
a wired/wireless detection unit to detect whether the apparatus is coupled to the host device via the wired link as one of a wired connection state and a wireless connection state; and
a storage device coupled to the processor, having sequences of instructions stored therein, which when executed by the processor cause the processor to:
determine a data transmission error rate of the apparatus during operation of the apparatus in a wireless communications mode if the wireless connection state is detected by the wired/wireless detection unit,
notify a device user to couple the wire link between the apparatus and the host device to switch the apparatus from the wireless communications mode to a wired communications mode when the data transmission error rate of the apparatus exceeds a pre-determined threshold error rate,
monitor detected interference levels that increased the data transmission error rate to determine if the detected interference levels have subsided during operation in the wired communications mode,
notify the user to disconnect the wire link between the apparatus and the host device when the detected interference levels have fallen within an accepted threshold level; and
once the user disconnects the wire link between the apparatus and the host device, switch the device from the wired communications mode to the wireless communications mode.

20. The apparatus of claim 19, wherein the instruction to switch the apparatus from the wireless communications mode to the wired communications mode further causes the processor to:
compare the transmission error rate with a pre-determined threshold error rate;
when the transmission error rate exceeds the pre-determined threshold error rate, query the wired/wireless detection unit to determine presence of a wire link coupled to the apparatus connection port;
when the wired link is coupled to the apparatus connection port, switch the apparatus from the wireless communications mode to the wired communications mode;

otherwise, notify an apparatus user to couple the wire link between the apparatus and the host device; and once the user couples the wire link between the apparatus and the host device, switch the apparatus from the wireless communications mode to the wired communications mode.

21. A system comprising:

a host device;

a wireless/wired communication device including:
- a communications interface, the communications interface to transmit data to the host device, and to receive data from the host device via a wire link during a wired communications mode and a wireless link during a wireless communications mode,
- a connection port coupled to the communications interface to enable coupling of the communication device to the host device via the wire link,
- a wired/wireless detection logic coupled to the communications interface to detect whether the communication device is coupled to the host device via the wire link as one of a wired connection state and a wireless connection state,
- a user interface coupled to the communications interface to notify a device user to couple the wire link between the communication device and the host device to enable the communications interface to switch from the wireless communications mode to the wired communications mode when the data transmission error rate of the communication device exceeds a pre-determined threshold if the wireless connection state is detected by the wired/wireless detection unit, and
- wherein the host device is to monitor detected interference levels that increased the data transmission error rate to determine if the detected interference levels have subsided during operation in the wired communications mode, the user interface is further to notify the user to disconnect the wire link between the communication device and the host device when the detected interference levels have fallen within an accepted threshold level, and once the user disconnects a wire link between the device and the host device, to switch the device from the wired communications mode to the wireless communications mode.

22. The system of claim 21, wherein the host device comprises:
- a host communications interface, the host communications interface to transmit data to the communications device, and to receive data from the communications device via the wire link during the wired communications mode and the wireless link during the wireless communications mode; and
- a host connection port coupled to the host communications interface to enable coupling of the host device to the communications device via the wire link.

* * * * *

UNITED STATES PATENT AND TRADEMARK OFFICE
CERTIFICATE OF CORRECTION

| | | |
|---|---|---|
| PATENT NO. | : 7,336,602 B2 | Page 1 of 1 |
| APPLICATION NO. | : 10/060757 | |
| DATED | : February 26, 2008 | |
| INVENTOR(S) | : Silvester | |

It is certified that error appears in the above-identified patent and that said Letters Patent is hereby corrected as shown below:

In column 3, at line 27, delete "requiting" and insert --requiring--.
In column 6, at line 50, delete "(HD)" and insert --(HID)--.
In column 10, at line 26, delete "RD" and insert --HID--.

Signed and Sealed this

Second Day of September, 2008

JON W. DUDAS
*Director of the United States Patent and Trademark Office*